Jan. 4, 1966 E. W. SCHLIEBEN 3,227,861

MAN AND MACHINE READABLE LABEL

Filed Jan. 11, 1961

INVENTOR.
Ernest W. Schlieben
BY Daniel R. Levinson
ATTORNEY.

3,227,861
Patented Jan. 4, 1966

3,227,861

MAN AND MACHINE READABLE LABEL

Ernest W. Schlieben, Ridgefield, Conn., assignor to The Perkin-Elmer Corporation, Norwalk, Conn., a corporation of New York Filed Jan. 11, 1961, Ser. No. 81,966
10 Claims. (Cl. 235—61.12)

This invention relates to a label which is both man and machine readable and a method for making such a label. More specifically, the invention provides a label which has characters or other symbols, for example, numbers, which are readable both in the ordinary way and also by a comparatively simple scanning and interpreting mechanism.

In recent years the development of labor-saving devices in the data storage and data processing fields has greatly reduced the amount of human labor required in the processing of routine data both of the numerical and non-numerical type. Thus, data processing cards of the type in which numerical and non-numerical data is stored by means of punched holes have become common in many of the various business fields in which the need for handling such data exists. Although such processes as punching holes in cards have advanced the art of data storage, nevertheless, a large area of business use is not best served by this means.

One of the major disadvantages of such a system is that the human reader cannot readily interpret the data which has been punched into a card; and, therefore, the punched cards are normally solely machine-read. If the card is intended to be both man and machine readable, the same information must be printed in normal type upon the surface of the card and then duplicated in machine-readable language by means of punched holes in a different part of a card. In this case, the machine which stores the information on the data card must necessarily be able to print with regular characters as well as be able to punch holes in the appropriate parts of the card; this necessarily requires a more complicated machine than would be required for only one of these two operations. Another disadvantage of the hole-punching technique for storing data on cards or the like is that the original cards are necessarily partly mutilated, thereby rendering them unattractive for use as consumer goods labels, business invoices, checks, price tags on articles, and similar uses where the unsightliness or possible difficulty of human reading may adversely affect customer relations and even cause loss of business.

The technique of hole-punching is also not readily adaptable to certain specific uses. For example, the reading of holes in normal cards or papers by optical scanning would require that the scanning be performed by a transmission-type of scan; that is, with the radiant energy source on one side and the detector on the other side of the card. Thus, hole punching in regular gummed paper would not be useful as adhesive labels, directly attached to merchandise, since the goods themselves would interfere with the reading thereof by this transmission technique. Although the material utilized as the label might be rendered highly reflecting or fluorescent by coating the front surface thereof so as to make the holes readable by reflected scanning techniques (i.e., radiant energy source and detector on the same side of the label), this also has disadvantages. First, if the label is merely highly reflective, it is possible that the merchandise reflectivity may be substantially as high as that of the label surface coating so that the "holes" reflect almost as well as the rest of the label. If special materials and scanning means are used, the cost factor may be a deterrent. Thus, if the whole label surface is coated with fluorescent dye and the reflection scanning is done by ultraviolet light, the likelihood that the underlying merchandise surface is similarly ultraviolet active is quite small, but since fluorescent dyes are comparatively expensive, the label costs would rise. Further, the possibility that the underlying goods are in an ultraviolet active coated package is still present.

For these reasons, in some fields, the use of printed black dots on a highly reflecting or fluorescent surface which would then be machine readable by reflective rather than transmission differences would be preferable. Although this technique would eliminate some of the disadvantages of the hole punching techniques, nevertheless, it also is subject to certain disadvantages. First, the use of highly reflecting or fluorescent dyes or other coating material on large areas of the label necessarily would increase the cost thereof. Secondly, the system would still require the labels to be large enough to contain both the machine-readable data and the human-readable data on another part thereof, thus requiring a label of greater size than would be required for either a solely machine or solely human readable label.

The invention avoids all of the above-mentioned difficulties by providing a coextensive human and machine-readable information area, which may comprise the entire surface of the label. In other words, the same part of the label which carries the machine-readable data also is readable in the normal manner by the customer. Further, only small parts of this field are treated with special dyes, such as fluorescent ink. In its more specific aspects, the invention utilizes an array of printed dots or squares having a highly different reflectivity or other luminous activity as to at least some radiant energy form than the rest of the card or label with human readable information overprinted thereon in such a manner as to cover selective groups of such dots or squares. In a preferred embodiment of the invention the label would be imprinted with a predetermined regular array of fluorescent dots and then overprinted by, say, numerical characters in the form of normal, opaque printer's ink, the human readable numbers being more or less the same as the conventional Arabic numbers.

By this means the amount of fluorescent ink required is kept to a minimum and at the same time no mutilation of the label or card is required. Since the area that is machine-readable is coextensive with that which is man-readable, the label need be no larger than would be required to contain either of these two information fields alone. Since fluorescent inks or dyes used for making the dots or squares may be of the same or similar reflectivity as to visible light as the background of the card, the customer need not even be conscious of the existence of the array of dots or squares, but ultraviolet scanning would readily determine the position of the uncovered dots or squares.

An object of the invention therefore is the provision of a label or other data storing card in which the information area which is machine-read and that which is humanly readable are essentially coextensive.

Another object of the invention is the provision of such a label or similar card in which the paper or cardboard is not mutilated in any way and which is readable by reflection-scanning techniques.

A further object of the invention is the provision of a label readable by both machine and man in which the information is placed on the card by simple printing machines similar to label printing machines now in use.

Another object of the invention is the provision of a man and machine-readable label, in which the total amount of expensive fluorescent or other special dyes is kept to a minimum.

A further object of the invention is the provision of a label which is machine-readable which is formed by simple printing techniques without requiring any expensive punches or dies.

Another object is the provision of a label in which the machine readable elements do not deface the appearance thereof and which, in fact, may even be invisible to casual observation.

A still further object of the invention is the provision of a label and a method of making the same which allows the manufacturer thereof to exercise a quality control of the machine-readable elements without requiring any elaborate or special printing mechanisms for placing the final information thereon.

Other objects and advantages of the invention will occur to one skilled in the art upon reading the following specifications and upon perusing the accompanying drawing in which.

Figure 1:
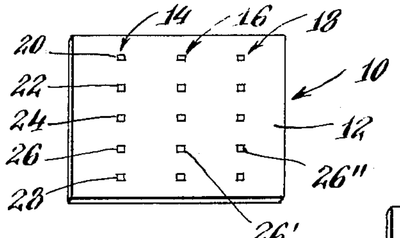
FIG. 1 is an elevational view of a label blank according to the invention, having rows of fluorescent dots thereon.

In FIG. 1 a label 10 comprising a conventional cardboard or paper backing member 12, which may have gum or other adhesive on the back thereof, is printed by the manufacturer with an array of fluorescent dots. These dots are arranged in vertical rows 14, 16 and 18, or in some other predetermined pattern, each row containing five equally spaced dots, such as 20, 22, 24, 26 and 28 in the left-hand column 14. The corresponding dots in the middle column 16 are primed and those in the right-hand column 18 are double primed. The label of FIG. 1 can be used to represent a three-digit number readable both by a machine utilizing the binary or other code and by a human observer, by means of the simple expedient of overprinting these fluorescent dots with Arabic numerals in such a manner as to leave exposed the binary or other code equivalent of the number desired. Thus, in FIG. 2 the same label blank 10 is shown having been overprinted by the user, such as a grocery store, with the numerals 1, 9 and 8 so as to suggest the price of a dollar, ninety-eight ($1.98). The numeral 1, referenced 34, is printed in opaque ink over the first column 14 of the dots in such a manner as to obscure all but the uppermost dot 20. The numeral 9, referenced 36 in FIG. 2, on the other hand, obscures all but the uppermost dot 20′ and the fourth or next to lowermost dot 26′, which (as will hereinafter be explained) also represents the numeral 9 in binary code. Similarly, the last numeral 8, referenced 38, obscures all but the next to lowermost dot 26″ of the right-hand column 18 of the fluorescent dots.

As previously mentioned, the form of the overprinted numerals 34, 36 and 38 are so chosen, in the illustrated embodiment, as to leave unobscured those dots on the original label which represent the numeral in binary code. Thus, reading the dots 20, 22, 24, 26 and 28 in FIG. 1 as a binary array from top to bottom, dot 20 would represent a single unit, dot 22 would represent 2, dot 24 would represent 4, dot 26 would represent 8 and dot 28 would represent 16. Thus, the left-hand column in FIG. 2 would be read by a scanner and binary converter as a 1 since only the uppermost dot 20 (representative of unity) is not obscured by the overprinted numeral 34. Similarly, the second column would be read by the binary scanner and interpreter as a 9 since the one unit and the eight unit dots are both unobscured, while the third (right-hand) column in FIG. 2 would be read as 8 since only the eight-unit binary dot is left unobscured.

Figure 3:
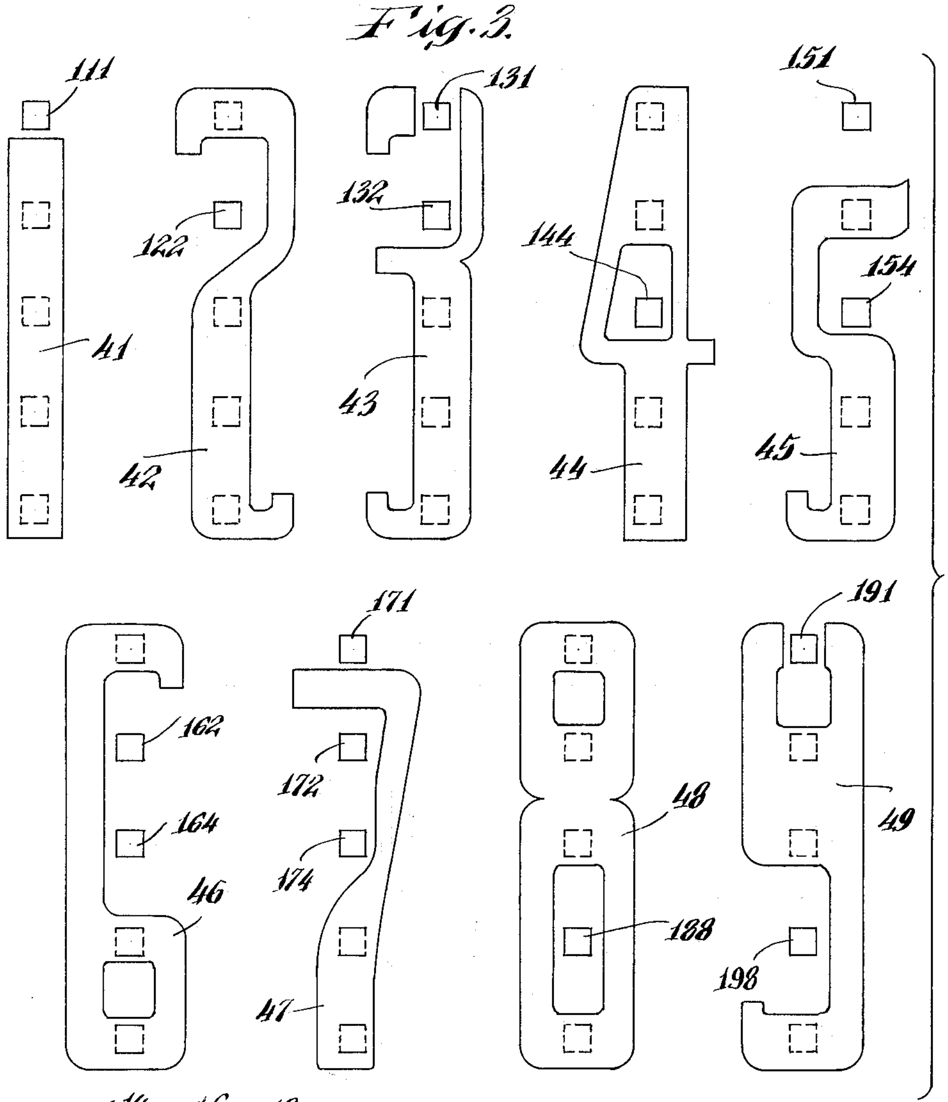
FIG. 3 is a diagrammatic showing of one proposed set of Arabic numerals which can be used with a label of the invention.

FIG. 3 shows examples of numerals 1 to 9 which might be utilized as the overprinted Arabic character in the inventive label. Each of the numerals shown in FIG. 3 has the property of obscuring all but those dots which represent the same number in binary code. Thus, numeral 1, referenced 41 in FIG. 3, leaves the upper or unity dot 111 exposed. Numeral 2, referenced 42 in FIG. 3, obscures all but the second or two unit binary code dot 122. Similarly the character referenced 43 not only appears as an Arabic number 3 but also leaves exposed the one unit and the two unit dots, 131 and 132, of the binary array exposed, thereby also being readable as a three by a binary code scanner and interpreter. The character referenced 44 obscures all but the central or four unit binary code dot 144 and of course also resembles the Arabic 4, thereby being both machine and man readable as the same number. Similarly, the characters referenced 45, 46, 47, 48 and 49 represent, respectively, the numerals 5, 6, 7, 8 and 9 both in appearance to the human eye and in their property of obscuring all but the binary code dots which represent these same numbers. Thus, character 45 leaves exposed the four and one unit binary code dots, 154 and 151 respectively; character 46 leaves unobscured the four and two unit binary code dots, 164 and 162; character 47 leaves exposed the four, two and one unit binary code dots, 174, 172 and 171; and, as previously explained in reference to FIG. 2, the characters 48 and 49 are readable by a binary code scanner as an 8 and a 9 respectively because of exposed dots 188 and 191 and 198, respectively.

Figure 2:
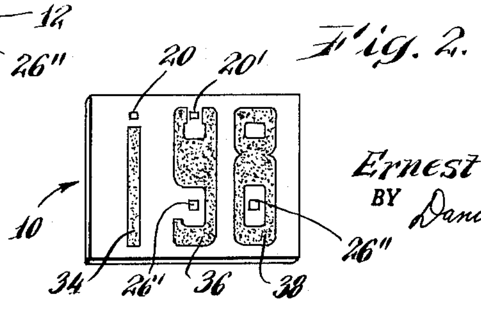
FIG. 2 is an elevational view of the same label after having been overprinted by numerals in opaque ink, thereby rendering the label readable by both man and machine.

Although the label of the invention has been illustrated in FIG. 1 and FIG. 2 as including a three-column array of five dots each, obviously more columns may be utilized on a label in order to represent numbers greater than 1,000. Similarly, the exact number of dots in any column need not be five, although for Arabic numerals this number appears to be preferable. Not only may the number of columns on any individual label be increased according to how large the total Arabic number may be, but the label may even be made as a single strip having columns of dots equally spaced along the entire length so that the user may cut the label to include as many or as few columns as necessary to convey the information required. For example, a grocery store may require a label requiring only two or three columns, while a business firm utilizing these labels as quality control or filing labels may require many more columns to represent the number of the order or shipment or large amounts of money. In all uses, however, it is preferable that the manufacturer print the dots on the form blank so as to maintain quality control to avoid any difficulty in the subsequent scanning of the overprinted form.

It may be noted that no character for a zero is shown in the drawing. The reason for this omission is that a vast number of forms of the zero may be utilized and easily read by a correctly programmed binary scanning and interpreting mechanism. For example, the printing of a zero over the five dots of a column in such a manner as to leave the middle three dots exposed would be readable in binary code as the impossible Arabic number 14; the interpreting part of the reading mechanism could be programmed to recognize this combination of three central dots as the zero. Alternatively, the zero may be printed with an open bottom so that the lowermost of fifth dot (which would represent a 16) could be left exposed and again the scanner and interpreter could recognize this as a zero. In fact, the interpreting means of the reading scanner could be programmed to recognize as a zero any character which could not be readable in binary code as any one of the numerals 1 through 9 if only these ten characters are utilized.

Although the invention has been explicitly disclosed for use in labels or similar information conveying means, the invention is not at all limited to such use. For example, accounting records are susceptible to the use of the invention without any modifications by simply printing many vertical columns of horizontal groups of five-dot arrays on the blank accounting sheet. In fact, by utilizing such columns of groups of dots, a scanner, in combination with a data processor, could add columns of figures without even necessarily reading out each individual numeral in an additive column. Thus, a bill or other accounting record form could be previously prepared by having the whole sheet covered with these five-dot columns, so that a special typewriter or other bill printing mechanism would print the numerals directly over the dots thereby letting each horizontal group represent a single number with each of these numbers vertically aligned much in the manner of normal additive columns. A vertical top-to-bottom scanner could then read each number in a vertical column and feed this as an input to a simple adding calculator machine with the normal decimal carry-over function so that the system could add the entire column of numbers by starting from the right-hand column and then adding the next higher unit columns. By using a more complicated calculator, all columns could be scanned and added simultaneously.

Other uses of the invention would include: use on both the monetary value and sorting data part of checks so that the check may be both man and machine readable and assorted; use on time records which could then be read by machines programmed to subtract one time from another for computing the weekly pay of hourly employees; and, in fact, use anywhere numerical data is stored and subsequently read whether followed by additional arithmetic processing or not. Although the term "label" has been used when referring to the invention, the uses suggested above, of course, would not necessarily involve labels in the usual sense of the term. Thus, a check would not comprise a separate piece of gummed paper or the like but rather the fluorescent dots could be printed directly on the central area of the check usually used for writing the value threof; similarly invoices, accounting records, time cards and the like could be printed in the normal form as large sheets of paper with the fluorescent dot arrays printed in the appropriate areas (i.e., those areas which could normally contain numerical data).

As previously stated the binary dots might be formed by fluorescent dyes or inks which have substantially the same reflectivity as the backing material as to visible light, yet which have much greater reflectivity as to, say, ultraviolet light. Such a label or accounting record then would appear to the casual observer to be perfectly uniform as to its background, but the binary dots would be easily detectable by an ultraviolet scanner. By this means the unsightliness caused by punched holes, black dots and the like may be completely avoided as far as customer relations are concerned, but without sacrificing any signal to noise ratio in the scanning mechanism, since although the label or business form may appear substantially identical to those commonly used, the ultraviolet scanner will encounter no difficulty in detecting the presence or absence of unobscured dots.

It might be noted here that the interpreting or logic circuit of the scanner should also be programmed to interpret five exposed dots in a column as a zero; that is, where no character is overprinted on the five dot array the scanning interpreting mechanism will ignore the entire column.

Although the invention has been disclosed as applying to numerical data and particularly for merchandising labels and similar purposes, in light of the description above of how the system may be used for accounting records, time records, checks, and similar forms, it is obvious that the invention is not limited to labels but on the contrary is usable in any endeavor which requires the handling of numerical data. Since the output of the initial scanning and interpreting means may be a binary code, the addition and multiplication of various numbers on the same or different labels or business forms is greately simplified. Therefore, the system of the invention is particularly adapted for use in automating entire numerical data-handling procedures.

It is also possible to utilize the system for non-numerical data by means of utilizing overprinted characters other than Arabic numbers which will encode underlying binary dots in a similar manner to the numerical system disclosed. Since a five-dot column is capable of producing 32 different possible binary readouts, the inclusion of such characters as a dollar sign or the like may be accomplished without any modification of the original printed label or business form; that is, characters other than numerals may be overprinted and assigned specific binary values which the machine may then read. Examples of such characters other than a dollar sign would be the letters "a.m." and "p.m." on a time card, departmental letters or abbreviations on accounting records, and other similar symbols. For such use the machine which reads the labels must of course be previously programmed to recognize the characteristic binary codes of these characters. Since the numbers 1 through 9 and zero require only 10 of the 32 distinct permutations of a five-dot binary code, it is possible to include 22 additional characters in the system without requiring any additional dots. By increasing the number of dots in a column, it is of course possible to extend the number of characters which could be recognized by the scanning and interpreting means so that the entire alphabet plus even additional symbols could be printed on business forms and read by machine. Although the illustrated embodiment utilizes a straight-line binary array, the pattern of the dots need not be linear, nor is it essential that the code used be binary.

Thus, it will be seen that the invention is not limited to any of the specific details shown in the drawings or described as the preferred form of accomplishing the invention; but, on the contrary, is considerably broader and is intended to be limited only by the appended claims.

I claim:

1. The method of storing data on a plane surface which comprises the steps of: printing upon the surface an ordered array of discrete marks having a substantially different luminous activity as to at least one form of radiant energy from the rest of said surface; and subsequently overprinting characters thereon with an opaque material in such a manner as to obscure some of said marks and leave unobscured those marks which represent the data intended to be stored, said overprinted characters resembling and being separately readable as said data to be stored.

2. The method of storing numerical data on a plane surface which comprises the steps of: printing upon the surface an ordered array of discrete marks in a binary code pattern; and subsequently overprinting numerical characters thereon in such a manner as to obscure some of said marks and leave unobscured those marks which represent in binary code the numerical data intended to be stored, said overprinted numerical characters resemblbling and being separately readable as numbers also representing said numerical data.

3. The method of storing data according to claim 2 in which said characters resemble and are readable as Arabic numerals.

4. A data storage device, comprising: a storage member having at least one plane surface; an array of substantially identical marks positioned thereon, said array being composed of a plurality of sub-arrays, each sub-array comprising the same number and arrangement of marks; and character superimposed on at least some of said sub-arrays, said characters being composed of opaque material so as to obscure any of said marks lying beneath any part of said characters.

5. A data storage device according to claim 4 in which each of said sub-arrays are columns of marks.

6. A data storage device according to claim 4, in which each of said sub-arrays are in a binary code pattern.

7. A data storage device according to claim 4, in which at least some of said characters resemble and are readable as numerals.

8. A data storage device according to claim 4 in which said sub-arrays are in a binary code pattern; and in which at least some of said characters resemble and are readable as numerals, said numerical characters being so superimposed on said binary code sub-arrays as to leave unobscured those marks which in binary code represent the same numerical value as that numeral which said overprinted character resembles.

9. A data storage device according to claim 4 in which said marks comprise fluorescent material, said fluorescent material having substantially the same visual appearance under ordinary lighting as the unmarked rest of said one plane surface but having much greater brilliance than said surface under ultraviolet light.

10. A data storage device according to claim 4 in which each of said characters represents the same information as those marks in the corresponding sub-array left unobscured thereby.

References Cited by the Examiner

UNITED STATES PATENTS

| | | | |
|---|---|---|---|
| 1,771,612 | 7/1930 | Block | 235—61.12 |
| 2,525,837 | 10/1950 | Simplair | 235—61.12 |
| 2,704,634 | 3/1955 | Rauch | 235—61.11 |
| 2,784,392 | 3/1957 | Chaimowicz | 235—61.12 X |
| 2,963,220 | 12/1960 | Kosten et al. | 235—61.12 |
| 3,100,834 | 8/1963 | Demer | 235—61.12 |

OTHER REFERENCES

National Bureau of Standards Report No. 5643, August 1957 (Stevens).

MALCOLM A. MORRISON, *Primary Examiner.*

WALTER W. BURNS, Jr., *Examiner.*